Jan. 26, 1960
C. W. OSMOND ET AL
2,922,445
DEVICE FOR REMOVING IMPROPERLY FILLED
CONTAINERS FROM A FILLING LINE
Filed March 5, 1958
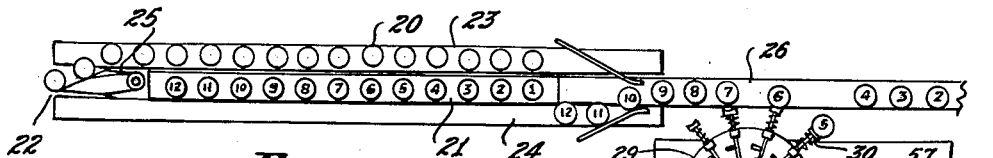
FIG.1.
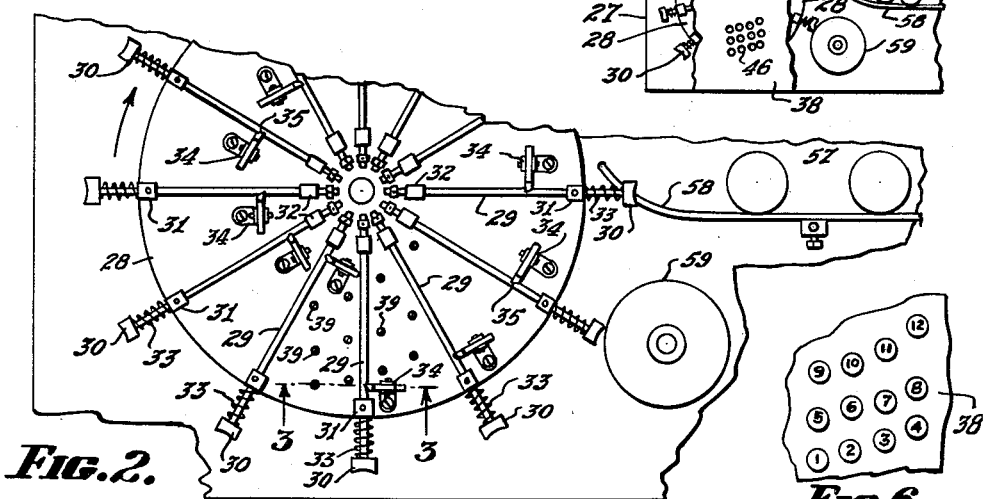
FIG.2.
FIG.6.
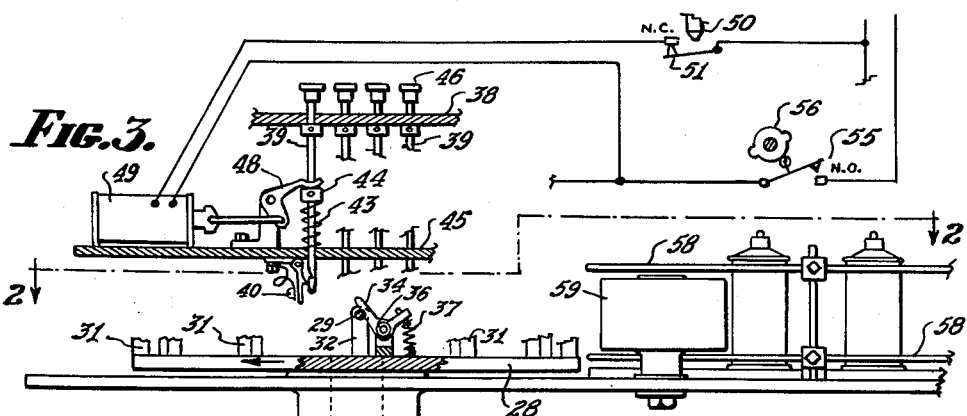
FIG.3.
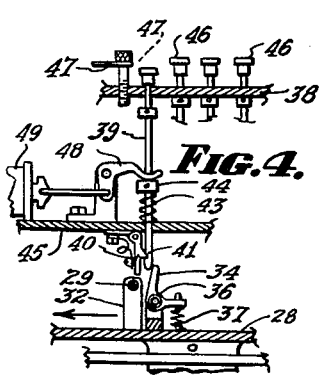
FIG.4.
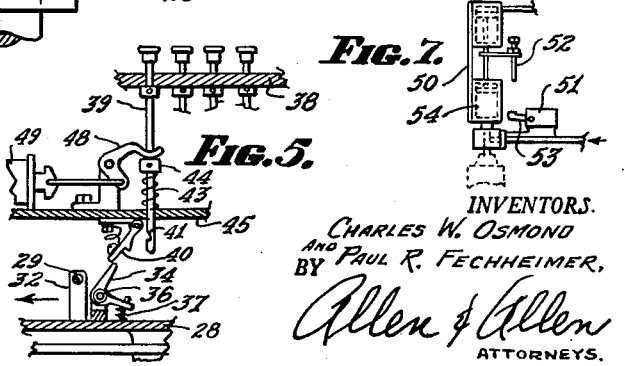
FIG.5.
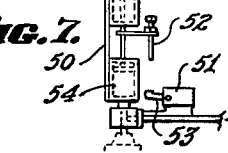
FIG.7.
INVENTORS.
CHARLES W. OSMOND
AND PAUL R. FECHHEIMER,
BY Allen & Allen
ATTORNEYS.

United States Patent Office 2,922,445
Patented Jan. 26, 1960

2,922,445
DEVICE FOR REMOVING IMPROPERLY FILLED CONTAINERS FROM A FILLING LINE

Charles W. Osmond, Anderson Township, Hamilton County, and Paul R. Fechheimer, Cincinnati, Ohio, assignors to The Karl Kiefer Machine Company, Cincinnati, Ohio, a corporation of Ohio Application March 5, 1958, Serial No. 719,339

15 Claims. (Cl. 141—170)

This invention relates to a device for automatically selecting and removing improperly filled containers from a continuously moving line of such containers as they are moved away from a filling or charging station.

In the copending application of Charles W. Osmond, Paul R. Fechheimer and Robert W. Kinney, Serial No. 708,033 entitled, "Charging Device for Pressurized Containers," there is taught a straight line charging device wherein a plurality of charging heads are arranged in a row and containers to be charged are alternatively fed onto conveyors lying on opposite sides of the row of charging heads. When a predetermined number of containers equal to the number of charging heads in the row have moved along one of the conveyors until they are in alignment with the charging heads, automatically acting transfer means act to bodily shift the containers onto lift platforms underlying the charging heads, whereupon the containers are juxtaposed to the charging heads and simultaneously charged with the desired contents. As the containers on one of the conveyors are shifted to the lift platforms, additional unfilled containers are delivered to the other of the conveyors and, as the latter group of containers advance into alignment with the charging heads, the container shifting means acts to redeposit the now charged containers onto the first conveyor and at the same time transfer the uncharged containers from the second conveyor onto the lift platforms. The feeding speed of the conveyors and the duration of the charging cycle are such that a continuous supply of filled containers are discharged from the device, a single exit conveyor being arranged to alternately receive filled containers from the two conveyors running along sides of the charging heads. The present device is intended to be used in conjunction with the exit conveyor of the charging device just described and it is so arranged that it will automatically remove from the exit conveyor any container which has not received its proper charge.

Essentially, the instant device comprises a rotating platform or turret positioned to one side of the exit conveyor, the turret mounting about its periphery a plurality of extensible magnetic members which are adapted, when extended, to make magnetic contact with a predetermined container as it is moved along on the conveyor, the magnetic member serving to remove the selected container from the conveyor and deliver it to a reject station.

Accordingly, a principal object of the instant invention is the provision of a device of the character described which is operated in timed relation to the movement of the charged containers, the device mounting a plurality of magnetic members corresponding in number to the number of filling heads making up the charging device, each of the magnetic members being individually movable to container contacting position upon malfunction of its corresponding charging head or upon preselection by the machine operator.

A further object of the invention is the provision of a device of the character described which facilitates the removal of improperly charged containers by automatically removing any container which was previously associated with a charging head which failed to complete its charging cycle.

A further object of the invention is the provision of a container removing device which may be preset to remove from a moving series of containers any one or more preselected containers for inspection or testing purposes.

Still a further object of the invention is the provision of a container removing device which will automatically remove during each cycle of operation one or more predetermined containers, as where one or more of the charging heads might be removed for repair or replacement.

The foregoing objects of the invention together with others which will appear hereinafter or which will be apparent to the skilled worker in the art upon reading these specifications, we accomplish by that construction and arrangement of parts of which we shall now describe an exemplary embodiment.

Reference is now made to the accompanying drawings wherein:

Figure 1 is a diagrammatic plan view with certain of the parts broken away illustrating the use of the container removing device in conjunction with a straight line charging device.

Figure 2 is an enlarged fragmentary plan view illustrating the turret of the container removing device.

Figure 3 is a fragmentary and diagrammatic elevational view illustrating the mechanism for actuating the extensible magnetic arms.

Figure 4 is an elevational view with parts in section illustrating the action of one of the actuating keys.

Figure 5 is a view similar to Figure 4 but illustrating the parts in an alternate position of use.

Figure 6 is a fragmentary plan view illustrating the keyboard for preselecting containers to be removed.

Figure 7 is a diagrammatic elevational view of a charging head structure incorporating circuit forming means for actuating the release mechanism for the magnetic arms.

Referring first to Figure 1, a straight line filling machine such as disclosed in the aforementioned Osmond et al. application Serial No. 708,033, is indicated generally at 20, the device having a straight line filling station 21 which, in the embodiment illustrated, is composed of a series of 12 filling or charging devices arranged in a row. It will be understood, of course, that the number of charging devices may be varied. A lead-in conveyor 22 delivers empty containers from a source of supply, the container being alternately transferred in groups of 12 to the conveyors 23 and 24, the transfer being effected by means of a pivoting sweep or finger 25 arranged to move in timed relation to the movement of the conveyors. At the opposite end of the filling device an exit conveyor 26 receives the charged container from the charging device and moves them to a subsequent operating station (not shown). In the position of the device illustrated, a group of 12 containers has just been delivered from conveyor 24 onto exit conveyor 26. At the same time another group of 12 charge containers has just been transferred from the charging station onto conveyor 23, and still another group of containers has just been shifted from conveyor 24 to the charging station 21, the latter shifting movement occurring simultaneously with the deposit of the charged containers onto conveyor 23. Since the conveyors all move in timed relation, it will be evident that as the container bearing number 12 passes from conveyor 24 onto conveyor 26, it will be followed by the leading container on conveyor 23. At the same time, a new group of uncharged containers are being diverted by the finger 25 onto conveyor 23 for movement into shifting position as the last of the charged containers on conveyor 23 reaches a position opposite numbered container 12 on conveyor 24.

The container removing device is indicated generally at 27, the device having a rotating turret 28 mounting a plurality of radially disposed arms 29 carrying magnetic heads 30. As best seen in Figure 2, each of the arms 29 is slidably journaled in a set of bearings 31, 32, the arms being normally spring-pressed outwardly by springs 33 surrounding the arms and extending between the bearing 31 and the magnetic heads 30. Arm engaging latches 34 are arranged to engage the arms 29 and restrain them in retracted position, the latches engaging in notches 35 in the arms. As best seen in Figure 3, the latches 34 are pivoted to brackets 36 and pressed by springs 37 into notch engaging position. Referring again to Figure 2, it will be noted that the latches 34 and their coacting notches lie at progressively increasing distance from the center of the turret so that, upon rotation of the turret, they will move in individual circular paths concentrically spaced with respect to each other.

A stationary platform 38 overlies the turret 28 and mounts a plurality of depressible trip rods 39, there being a separate trip rod positioned to contact each of the latches 34. As best seen in Figure 6, the trip rods are interspaced relative to each other in such fashion that only one of the rods, when depressed, will lie in the path of a given latch. When depressed, the rods are maintained in depressed condition by means of spring-pressed latch dogs 40 engageable in notches 41 in the trip rods. When the rods are depressed a distance sufficient to be engaged by the latch dogs 40, the lower ends of the depressed rods will lie in the paths of the corresponding latches 34 which release the arms 29. This action being best seen in Figure 4 of the drawings wherein it will be seen that as a given latch 34 moves into contact with the lower end of a depressed trip rod 39, the latch will be moved against the compression of its spring 37, thereby releasing the latch from engagement with the notch 35 in the arm 29, and the arm will be moved outwardly by the action of its spring 33, thereby bringing the magnetic head 30 into container contacting position.

As seen in Figure 5, the positioning of parts is such that as the latch 34 is tripped by the end of the trip rod, it will pass beyond the lower end of the trip rod and will thereafter contact the latch dog 40 and pivot it against the compression of its spring, thereby releasing the latch dog from notch 41 and permitting the trip rod to move upwardly under the influence of spring 43 which extends between a collar 44 on the rod and an intermediate stationary platform 45 through which the lower ends of the trip rods extend and to the undersurface of which the latch dogs 40 are secured.

As will now be evident, the individual trip rods may be depressed in latch engaging position by an operator selectively pressing the buttons 46 on the upper end of the rods. If it is desired to lock-out one or more of the trip rods, i.e. retain them in depressed position for more than one revolution of the turret, a locking arm 47 may be provided adjacent each of the buttons, which arm may be pivoted to overlie the adjacent button, in the manner illustrated in dotted lines in Figure 4.

Means are also provided to automatically depress any given trip rod should the corresponding charging head fail to deliver a full charge to the container presented thereto. Thus, as seen in Figure 3, each of the trip rods 39 is provided with a pivoted finger 48 arranged to contact the collar 44, the opposite end of the finger being operatively connected to a solenoid 49 forming part of an actuating circuit connected to each of the container charging heads. When the solenoid 49 is actuated it will cause finger 48 to push downwardly against collar 44, thereby depressing the trip rod and engaging latch dog 40.

An exemplary charging head is illustrated in Figure 7 and designated by the reference numeral 50, the charging head being provided with a normally closed switch 51 adapted to be opened by a rod 52 arranged to contact the actuating arm 53 of the switch only upon evacuation of the full charge of material contained in the charging cylinder 54 of the head.

Referring again to Figure 3, the circuit to each of the solenoids 49 also includes a normally open switch 55 operatively connected to a timing cam 56 arranged to close and open the switch at predetermined time intervals. The closing and opening of switch 55 is timed to the movement of the conveyors and the actuation of charging heads 50, the closing of the switch 55 occuring at such time as the charging cylinders of the charging heads would be normally evacuated. If the charging head is functioning properly and its full charge is delivered the underlying container, the switch 51 will be opened at the time the switch 55 is closed by the timing cam, and the solenoid will remain inactive. If, however, the charging head fails to discharge its full supply of charging material, the rod 52 will fail to travel downwardly to its full extent and the switch 51 will remain closed when the switch 55 is closed, and a circuit will be effected to the solenoid 49, the solenoid being actuated to depress the corresponding trip rod, thereby releasing the corresponding arm and magnetic head to contact and remove the improperly filled container from the conveyor line.

Referring again to Figures 1 and 2, it will be understood that the timing of the device is such that the number 1 container engaging arm will move into container contacting position just as the number 1 container in the line reaches a point on conveyor 26 in substantial tangential relationship to the rotating turret. Of course, if the arm 29 remains in retracted position, its magnetic head will be spaced from the container and the container will be free to continue its movement along the conveyor. If, however, the arm has been extended either by manual depression of the corresponding button 46 or by the action of the corresponding solenoid, the magnetic head will be extended to container contacting position and container will be picked from the conveyor 26 and moved onto reject platform 57 where the container will be stripped from the magnetic head by means of stripper bars 58. Upon passage beyond the stripper bars 58 the extended arm comes into contact with a freely rotatable wheel 59 positioned to exert a camming action against the extended rod to move it inwardly to retracted position, whereupon the latch 34 engages in notch 35 to retain the arm in the retracted or "cocked" position. Of course, if the arm is already in retracted position, it will simply make tangential contact with the wheel 59 and will remain in the retracted position. Preferably, the wheel 59 will be formed with a resilient surface to afford smooth operation of the parts.

Modifications may, of course, be made in the invention without departing from the spirit of it. For example, while we have described the invention in conjunction with containers adapted to be contacted by magnetic means, it should be evident that the invention may be readily adapted for use with nonmagnetic containers. In such event, the magnetic heads 30 may be replaced by vacuum gripping means connected through the arms 29 to a vacuum source. In addition, it will be evident that the device will find utility in conjunction with rotary types of filling or charging devices in addition to the straight line type illustrated herein, the essential factor being the synchronization of movement between the rotating turret and the containers as they are delivered from the filling or charging device. For example, in a continuously operating rotary filling device having eight heads, the turret would be provided with a corresponding number of arms disposed at intervals of 45° about the circumference of the turret. The turret being rotated in timed relation to the movement of the rotary filling device.

Having thus described the invention in an exemplary embodiment, what is desired to be secured and protected by Letters Patent is:

1. In a device for selectively removing containers from a conveyor, a rotatable turret, a plurality of axially extensible arms radially disposed on said turret, said arms being movable outwardly from an inoperative to an operative position, spring means biasing said arms outwardly to their operative position, means for moving said arms inwardly to inoperative position, latch means for maintaining said arms in inoperative position, means for selectively releasing said latch means to thereby release said arms for movement to operative position, and means mounted on the ends of said arms for engaging and removing containers from the conveyor when said arms are in operative position.

2. In a device for the purposes described a rotatable turret, a plurality of radially disposed arms mounted on said turret, said arms being movable outwardly from an inoperative to an operative position, spring means biasing said arms to their operative position, means for moving said arms from the operative to inoperative position, latch means for maintaining said arms in the inoperative position, means for selectively releasing each of said latch means, whereby to selectively release said arms for movement to their operative position, said means including depressible pins arranged, when depressed, to contact and release said latches, and means on the outer ends of said arms for engaging and moving containers contacted thereby.

3. The device claimed in claim 2 wherein said depressible pins are spring biased away from said latches, and wherein means are provided to releasably maintain said pins in depressed position.

4. The device claimed in claim 3 wherein means are provided to automatically depress said pins.

5. The device claimed in claim 4 wherein said pins are also manually depressible.

6. In a device for removing improperly charged containers from a line of containers moving on a conveyor, the containers having been delivered seriatim to the conveyor from a charging device having a plurality of charging heads, said container removing device comprising a rotatable turret adapted to be positioned to one side of the conveyor, a plurality of container contacting members mounted on said turret and rotatable therewith, said container contacting members being arranged to be sequentially presented to consecutive containers on the conveyor, said container contacting members each being movable outwardly from an inoperative to an operative position, spring means normally biasing said members to the operative position, means operative during each rotative cycle of said turret to move said container contacting members to the inoperative position, latch means for engaging and maintaining said members in the inoperative position, and latch release means selectively operable to release predetermined ones of said container contacting members for movement to the operative position.

7. The device claimed in claim 6 wherein said latch release means comprises a plurality of depressible rods each arranged, when depressed, to contact and release the latch means for a specified one of said container contacting members.

8. The device claimed in claim 7 including means for automatically depressing said rods in accordance with the operation of the charging heads of the charging device.

9. The device claimed in claim 8 including locking means for maintaining said depressible pins in depressed condition, and automatically acting means controlled by the rotation of said turret for releasing said pin locking means at a predetermined point in the rotative cycle of said turret.

10. In a device for removing improperly charged containers from a line of containers moving on a conveyor, the containers having been delivered seriatim to the conveyor from a charging device having a plurality of charging heads, said container removing device comprising a turret rotatable in timed relation to the movement of the conveyor, a plurality of radially disposed container contacting members mounted on said turret for movement therewith and arranged to be sequentially presented to consecutive containers on the conveyor, said container contacting members each being movable from an inoperative to an operative position, spring means normally biasing said container contacting members to the operative position, means for contacting and moving said container engaging members to inoperative position, latch means on said turret for engaging and maintaining said container contacting members in inoperative position, each of said container contacting members being spaced from the center of rotation of said turret by a different distance, whereby said latches will move in individual circular paths concentrically spaced with respect to each other, a stationary platform overlying said turret, a plurality of depressible trip rods mounted on said platform, said rods, when selectively depressed, each lying in the path of rotation of one of said latch means, said latch means being arranged, when tripped by its co-acting trip rod to release the container contacting member associated therewith for movement to operative position.

11. The device claimed in claim 10 including releasable locking means for maintaining said trip rods in depressed condition, said locking means being releasable during each rotative cycle of said turret subsequent to the tripping of the latch means by a depressed trip rod.

12. The device claimed in claim 11 wherein said trip rods are manually depressible, and wherein automatically acting depressing means are also associated with each of said trip rods, said automatically acting means being operatively connected to the charging heads of the charging device and controlled thereby.

13. The device claimed in claim 12, wherein the means for automatically depressing said trip rods comprises a solenoid associated with each of said trip rods, and wherein circuit means operatively connect said solenoids with the charging heads of the charging device.

14. The device claimed in claim 13, wherein the circuits connecting said solenoids to the charging heads of the charging device include normally open switch means adapted to be periodically closed in timed relation to the operating cycle of the charging heads.

15. The device claimed in claim 14, wherein the said circuits include normally closed limit switches adapted to be opened by the charging heads at the completion of their charging cycle.

References Cited in the file of this patent

UNITED STATES PATENTS

| | | |
|---|---|---|
| 2,687,202 | Nordquist et al. | Aug. 24, 1954 |
| 2,700,465 | Pechy et al. | June 25, 1955 |
| 2,702,120 | Nordquist | Feb. 15, 1955 |
| 2,723,748 | Simpson | Nov. 15, 1955 |